Figure 1:
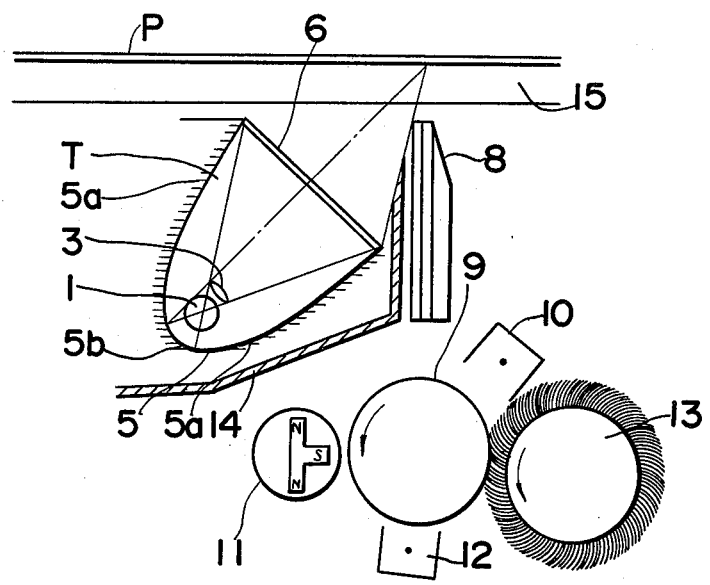

United States Patent [19]
Tanaka

[11] 3,936,672
[45] Feb. 3, 1976

[54] ILLUMINATION DEVICE FOR COPYING MACHINE

[75] Inventor: Atsuyuki Tanaka, Sakai, Japan

[73] Assignee: Minolta Camera Kabushiki Kaisha, Osaka, Japan

[22] Filed: July 1, 1974

[21] Appl. No.: 484,890

[30] Foreign Application Priority Data
Aug. 6, 1973 Japan............... 48-92565[U]

[52] U.S. Cl.............. 240/47; 240/11.4 R; 355/1; 355/30; 355/67
[51] Int. Cl.² ........................................ F21V 29/00
[58] Field of Search............ 240/47, 11.4 R, 1.3; 355/67, 8, 30, 1

[56] References Cited
UNITED STATES PATENTS

| | | | |
|---|---|---|---|
| 2,431,520 | 11/1947 | Streich | 240/47 |
| 3,265,885 | 8/1966 | Porter | 240/11.4 R |
| 3,433,566 | 3/1969 | Blatter | 240/47 X |
| 3,532,424 | 10/1970 | Miles | 240/47 X |
| 3,598,486 | 8/1971 | Kushima | 355/30 X |
| 3,741,642 | 6/1973 | Reick et al. | 355/8 |
| 3,765,828 | 10/1973 | Lux | 355/67 X |
| 3,779,638 | 12/1973 | Ravera et al. | 355/67 X |

*Primary Examiner*—Richard L. Moses
*Attorney, Agent, or Firm*—Wenderoth, Lind & Ponack

[57] ABSTRACT

An illumination device for use in a copying machine of a type wherein the optical system comprises an image transmitter formed by a bundle of optical fibers of graded refractive index. The illumination device comprises a halogen vapor lamp housed in position within a casing forming a reflector and a pair of ventilation fans arranged adjacent both ends of the casing for simultaneously blowing and exhausting air into and from the casing to cool the halogen vapor lamp within the casing. The ventilation fans are reversible in operation.

4 Claims, 5 Drawing Figures

ILLUMINATION DEVICE FOR COPYING MACHINE

The present invention relates in general to a copying apparatus of a type employing an optical system in the form of an image transmitter formed by a bundle of optical fibers of graded refractive index and, more particularly, to an illumination device particularly utilizable in the copying apparatus of the type referred to above for illuminating the original to be copied.

A diversity of copying machines, whatever type of copying process they employ, are now commercially available. Most of the commercially available copying machines are bulky and the recent trend in the concern of the related industry is development of relatively small-sized copying machines. Though there are numerous methods of reducing the size of a copying machine, one of the relatively small-sized copying machines that have heretofore been developed employs for its optical system an image transmitter composed of a plurality of "SELFOC" (a trademark registered in Japan and owned by Nippon Sheet Glass Co., Ltd.) lenses in a bundled configuration.

The SELFOC lens refers to an image transmitting optical fiber having a refractive index distribution in a cross section thereof that varies consecutively and parabolically outwards from a center portion, said refractive index distribution satisfying the following equation: $n = N(1 - ar^2)$, wherein $N$ is a refractive index at the center, $n$ is a refractive index at a distance $r$ from the center and $a$ is a positive constant. The SELFOC lens and the image transmitter formed by a bundle of SELFOC lenses are described in the U.S. Pat. No. 3,658,407, patented on Apr. 25, 1972, and therefore reference may be made thereto for the details thereof.

As regards the illumination device employed in a commercially available copying machine, since the optical system of the copying machine employs a spherical lens assembly which requires a relatively large space for installation thereof within the copying machine, a relatively large space is correspondingly available for installation of the illumination device and, therefore, any of various types of light sources forming a part of the illumination device can be advantageously employed. However, where the particular image transmitter of the type referred to above is employed in the optical system of the copying machine, the space available for installation of the illumination device is considerably limited because of an extremely small size of the particular image transmitter as compared with the spherical lens assembly. By way of example, whereas the use of the spherical lens assembly for the optical system of the copying machine requires the entire path of travel of light rays, which carries an image of the original to be copies, to extend on the order of 800 mm., the use of the particular image transmitter requires the same to extend on the order of 50 mm.

Therefore, it will be seen that the use of the conventional illumination device in the copying machine having the optical system in the form of the particular image transmitter would result in various inconveniences all attributable to heat energy emitted from a light source, for example, an electric lamp, due to the fact that most of the components of the copying machine can be arranged in relatively close relation to each other. Of these inconveniences, one is heating of a transparent support table, on which the original to be copied is placed, to an extent that an operator of the machine feels uncomfortable to touch and another is heating of a photoreceptor drum having an electrophotosensitive layer or coating on the outer periphery thereof, which would result in an unfavourable deformation of the coated layer. The worst of all would be heating of the particular image transmitter which adversely affects the image transmitting characteristic thereof in such a manner that, if a unitary optical fiber forming a part of the particular image transmitter is made of synthetic resin, the particular image transmitter would be deformed and/or that a binding agent made of synthetic resin and used to bundle the optical fibers to form the particular image transmitter would be remelted.

In order to eliminate the above mentioned inconveniences, it can be considered to provide an illumination device including a halogen vapor lamp, that is, a tungsten filament lamp containing a gaseous body of halogen, which halogen vapor lamp is cooled during operation of the copying machine by applying a cooling air in one direction to the halogen vapor lamp. The halogen vapor lamp is well understood as an electric lamp which emits a sufficient quantity of light with relatively small power consumption.

However, since the halogen vapor lamp undergoes a halogen regenerative cycle during energization thereof as is well understood by those skilled in the art, application of the cooling air in one direction causes localized areas on the lamp tube to be excessively cooled in relation to the other area so that the halogen vapor lamp will no longer undergo the halogen regenerative cycle in a satisfactory manner, which leads to tube blackening occurring earlier than expected.

Accordingly, an essential object of the present invention is to provide an improved illumination device particularly useable in a copying apparatus of a type wherein the optical system comprises the particular image transmitter formed by a bundle of optical fibers of graded refractive index, which comprises means for applying a cooling air alternately in both directions parallel to the longitudinal axis of the illuminating tube, thereby substantially eliminating the inconveniences inherent in the copying machine of a similar type.

Another important object of the present invention is to provide an improved illumination device of the type referred to above, wherein the cooling air applying means satisfactorily functions to avoid heating of some components of the machine surrounding the illumination device, without hampering the halogen regenerative cycle occurring in the halogen vapor lamp.

A further object of the present invention is to provide an improved illumination device of the type referred to above, which can be easily manufactured at relatively low cost.

According to a preferred embodiment of the present invention, the illumination device comprises a source of light employed in the form of a halogen vapor lamp of a tube-like shape having a sufficient length to illuminate substantially the entire width of a transparent support table adapted to support thereon the original to be copied. The halogen vapor lamp is mounted in position within a substantially U-sectioned casing having a pair of adjoining side edges which extend in substantially parallel relation to the plane of the support table and which define an opening facing the support table at an acute angle. The opening of the U-sectioned casing is closed by a screen, either a sheet glass or a contrast-building red filter, thereby providing a ventilation passage within the casing in a direction parallel to the lengthwise direction of the halogen vapor lamp.

A pair of ventilating fans are provided adjacent both ends of the casing and are operatively associated with each other in such a manner that when one of the ventilating fans rotates in one direction to blow cooling air into the casing, the other ventilating fan rotates in the opposite direction to exhaust the cooling air from the interior of the casing towards the outside thereof. These ventilating fans are alternately reversed in operation, thereby preventing the halogen vapor lamp from being locally cooled. The intended ventilation of the interior of the casing is carried out in such a manner that the halogen regenerative cycle occurring in the halogen vapor lamp during energization thereof can not be hampered.

In view of the foregoing, air heated by the lamp within the casing can be so positively exhausted that various components, including the particular image transmitter, of the copying machine can be arranged in relatively close relation to the illumination device of the present invention within the copying machine without being substantially adversely affected by the heat of the lamp. This feature contributes not only to reduction in size of the copying machine, but also to the extended service life of the halogen vapor lamp used.

It should be noted that the number of the ventilating fans may not be always limited to two, but a single ventilating fan suffices.

Figure 2:
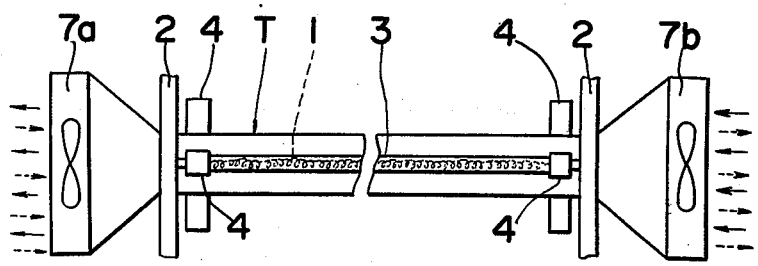
Figure 3:
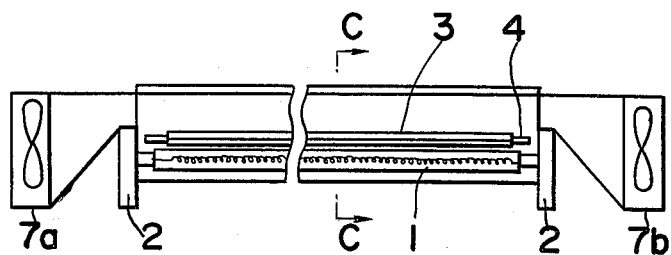
Figure 4:
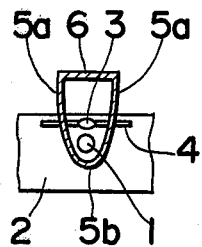
Figure 5:
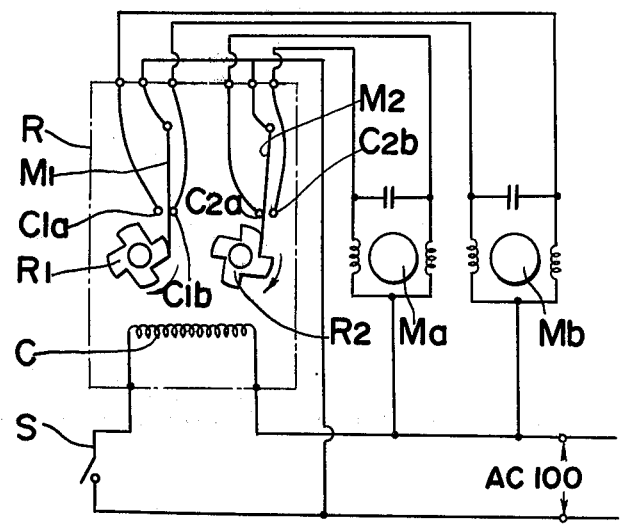

The objects and characteristic features of the present invention will become more apparent and more readily understood from the following description taken in conjunction with a preferred embodiment thereof with reference to the accompanying drawings, in which:

FIG. 1 is a schematic side sectional view of an illumination device, embodying the present invention, and essential components of a copying machine that are arranged adjacent the illumination device, FIG. 2 is a schematic top plan view of the illumination deivce, with a portion broken away, FIG. 3 is a side view of the illumination device shown in FIG. 2, FIG. 4 is a cross sectional view taken along the line C—C in FIG. 3, and FIG. 5 is an electrical circuit diagram showing an electrical circuit for ventilating fans employed in the illumination device of the present invention.

Referring first to FIG. 1, in which a copying machine equipped with the illumination device T of the present invention is illustrated, the illumination device T is supported in position adjacent a particular image transmitter 8 arranged adjacent a transparent support table 15 for supporting thereon the original to be copied and spaced therefrom through a partition member 14 made of a heat insulating material. The illumination device T is so positioned that rays of light emitted therefrom illuminate the original P on the support table 15 and are then reflected through the image transmitter 8 onto a photoreceptor drum 9 to project an image of the original P on the outer peripheral surface of said drum 9.

The photoreceptor drum 9 is rotatably mounted in position within the copying machine in any known manner and, around the drum 9, an electrostatic charger 10, a developing unit 11, a transfer charger 12 and a toner removal unit 13 are arranged in order and in a known manner. In other words, the copying machine illustrated operates in such a manner that, during each rotation of the drum 9, electrostatic charging, exposure, development, toner transfer and toner removal are sequentially performed.

The illumination device T comprises, as shown in FIGS. 2 to 4, a halogen vapor lamp 1 of a tube-like shape having both ends received by sockets (not shown) which are carried by associated lamp holders 2, respectively, a condensing lens 3 having both ends supported by lens holders 4, a substantially U-sectioned casing 5 having a pair of adjoining side edges which substantially define an opening facing the support table 15 at an acute angle, and a pair of vantilating fans 7a and 7b operated by a control circuit as will be described later, said halogen vapor lamp 1 and said condensing lens 3 being supported in position within said casing 5. The illumination device T further comprises a screen 6, which may be a sheet glass or a contrast-building red filter, mounted on said casing so as to close the opening defined by the adjoining side edges of the casing 5. The inner surface of the casing 5 facing the halogen vapor lamp 1 is formed of reflectors as at $5a$ and $5b$.

The control circuit is, as shown in FIG. 5, designed such that, when a switch S, adapted to be closed each time reproduction of the original P on a single copying material is, for example, by means of a counter which counts the number of actual reproductions performed by the copying machine, is closed, a coil C of a ratchet relay R is energized. Each time the coil C is energized, ratchet wheels $R_1$ and $R_2$ are each rotated through an angle of 45° and, therefore, as the ratchet wheels $R_1$ and $R_2$ are stepwisely rotated, movable contacts $M_1$ and $M_2$ are alternately engaged to contacts $C_{1a}$ and $C_{1b}$ and contacts $C_{2a}$ and $C_{2b}$, respectively.

Therefore, reversible motors $Ma$ and $Mb$ are alternately driven in the opposite directions. More particularly, assuming that the movable contacts $M_1$ and $M_2$ are engaged to the contacts $C_{1b}$ and $C_{2a}$ as shown, the motors $Ma$ and $Mb$ of the associated fans $7a$ and $7b$ are driven in the opposite directions with respect to each other to cause the fan $7a$ to blow air into the casing 5 and concurrently the fan $7b$ to exhaust air from the casing as indicated by arrow-headed broken lines in FIG. 2. However, when the movable contacts $M_1$ and $M_2$ become engaged to the contacts $C_{1a}$ and $C_{2b}$, respectively, the motors $Ma$ and $Mb$ are reversed to cause the fan $7a$ to exhaust air from the casing 5 and concurrently the fan $7b$ to blow air into the casing 5 as indicated by arrow-headed full lines. It should be noted that the cooling operation performed in the manner as hereinabove described should be such that the sufficient halogen regenerative cycle will not be hampered.

From the foregoing full description of the present invention, it has now become clear that the aforesaid inconveniences inherent in the conventional copying machine can be satisfactorily and effectively eliminated.

Although the present invention has been fully described by way of example, it should be noted that various changes and modifications are apparent to those skilled in the art and, therefore, should be construed as included within the true scope of the present invention unless otherwise they depart therefrom.

What is claimed is:

1. An illumination device for use in a copying apparatus of a type wherein the optical system comprises an image transmitter formed by a bundle of optical fibers having a refractive index distribution in the cross section thereof, said illumination comprising a substantially U-sectioned casing having a pair of adjoining side edges which define an opening facing a transparent support surface of the copying apparatus, said surface being adapted to support thereon an original to be copied, the inner surface of said casing forming a reflector, a source of light mounted in position within said casing, means for, upon receipt of rays of light from said light source, producing a slit-shaped beam of light to illuminate the original on the support-surface, and cooling means for directing cooling air alternately in both directions past said light source and parallel to the longitudinal axis thereof.

2. An illumination device as claimed in claim 1, wherein said light source is a halogen vapor lamp.

3. An illumination device as claimed in claim 2, wherein said cooling means comprises at least one ventilating fan arranged adjacent one end of said casing.

4. An illumination device as claimed in claim 2 wherein said cooling means comprises a pair of ventilating fans, each said fan arranged adjacent opposite ends of said casing and operable synchronously in the opposite relation to each other.

* * * * *